United States Patent
Liao et al.

(10) Patent No.: US 12,443,218 B2
(45) Date of Patent: Oct. 14, 2025

(54) CLOCK AND DATA RECOVERY CIRCUIT MODULE, MEMORY STORAGE DEVICE AND SIGNAL CALIBRATION METHOD

(71) Applicant: PHISON ELECTRONICS CORP., Miaoli (TW)

(72) Inventors: Yu-Chiang Liao, Miaoli County (TW); Jen-Chu Wu, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 57 days.

(21) Appl. No.: 18/637,397

(22) Filed: Apr. 16, 2024

(65) Prior Publication Data

US 2025/0298433 A1    Sep. 25, 2025

(30) Foreign Application Priority Data

Mar. 19, 2024 (TW) .................. 113110183

(51) Int. Cl.
*G06F 1/12* (2006.01)
*G06F 1/08* (2006.01)
*H04L 7/02* (2006.01)

(52) U.S. Cl.
CPC .................. *G06F 1/12* (2013.01); *G06F 1/08* (2013.01); *H04L 7/02* (2013.01)

(58) Field of Classification Search
CPC ........................................................ G06F 1/12
See application file for complete search history.

(56) References Cited

U.S. PATENT DOCUMENTS

| | | | |
|---|---|---|---|
| 6,041,090 A | 3/2000 | Chen | |
| 11,032,055 B1 * | 6/2021 | Tseng | H04L 7/0337 |
| 11,277,141 B1 * | 3/2022 | Sathe | G06F 1/10 |
| 11,575,498 B2 * | 2/2023 | Weng | H02M 3/07 |
| 12,205,673 B1 * | 1/2025 | Ravi | G11C 8/18 |
| 2004/0071251 A1 * | 4/2004 | Sutioso | H03L 7/081 |
| | | | 375/373 |
| 2006/0103439 A1 * | 5/2006 | Roth | G06F 5/08 |
| | | | 327/156 |
| 2007/0241832 A1 * | 10/2007 | Nervegna | H03K 4/501 |
| | | | 331/176 |
| 2020/0033909 A1 * | 1/2020 | Rupert | G06F 1/10 |
| 2020/0084015 A1 * | 3/2020 | Manian | H03L 7/0807 |
| 2020/0169261 A1 * | 5/2020 | Ryu | H03L 7/091 |
| 2020/0319666 A1 * | 10/2020 | Yang | G06F 1/08 |

OTHER PUBLICATIONS

"Office Action of Taiwan Counterpart Application", issued on Nov. 22, 2024, p. 1-p. 4.

* cited by examiner

*Primary Examiner* — Phil K Nguyen
(74) *Attorney, Agent, or Firm* — JCIPRNET (57) ABSTRACT

A clock and data recovery circuit module, a memory storage device and a signal calibration method are disclosed. The method comprises: receiving a reference clock signal and a first clock signal and detecting a first difference value between the reference clock signal and the first clock signal by a first detector; receiving a data signal and a second clock signal and detecting a second difference value between the data signal and the second clock signal by a second detector; generating a first clock signal and a second clock signal according to one of the first difference value and the second difference value; and adjusting one of the reference clock signal, the first clock signal and the second clock signal according to the second difference value.

24 Claims, 8 Drawing Sheets

CLOCK AND DATA RECOVERY CIRCUIT MODULE, MEMORY STORAGE DEVICE AND SIGNAL CALIBRATION METHOD

CROSS-REFERENCE TO RELATED APPLICATION

This application claims the priority benefit of Taiwan application serial no. 113110183, filed on Mar. 19, 2024. The entirety of the above-mentioned patent application is hereby incorporated by reference herein and made a part of this specification.

BACKGROUND

Technical Field

The disclosure relates to a clock and data recovery circuit module, a memory storage device and a signal calibration method.

Description of Related Art

Generally speaking, in order to achieve clock synchronization between a memory storage device and a host system, a clock and data recovery circuit module is generally used in the memory storage device to calibrate clock signals used by the memory storage device according to signals (e.g., data signal and/or clock signal) from the host system.

Traditionally, in a clock and data recovery circuit module that supports both frequency calibration capability and phase calibration capability, the frequency and the phase of the clock signal used by the memory storage device are often calibrated sequentially. For example, when a connection between the memory storage device and the host system is established, the frequency of the clock signal used by the memory storage device may be calibrated according to the clock signal from the host system firstly. After the frequency calibration is finished, the phase of the clock signal used by the memory storage device may be calibrated according to the data signal from the host system, so that the phase of the clock signal used by the memory storage device may be locked at the preset lock point (also referred to as sampling point) in the data signal. However, in a data transmission system that pursues connection establishment efficiency and/or system initialization efficiency, how to effectively improve signal calibration efficiency is actually one of the topics that those skilled in the art are devoted to research.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a clock and data recovery circuit module, a memory storage device and a signal calibration method, which may improve signal calibration efficiency.

An exemplary embodiment of the present disclosure provides a clock and data recovery circuit module, which includes a first detector, a second detector, a clock signal generation circuit and a phase adjustment circuit. The clock signal generation circuit is coupled to the first detector and the second detector. The phase adjustment circuit is coupled to the clock signal generation circuit. The first detector is configured to receive a reference clock signal and a first clock signal and detect a first difference value between the reference clock signal and the first clock signal. The second detector is configured to receive a data signal and a second clock signal and detect a second difference value between the data signal and the second clock signal. The clock signal generation circuit is configured to generate the first clock signal and the second clock signal according to one of the first difference value and the second difference value. The frequency of the second clock signal is higher than the frequency of the first clock signal. During a time period in which the first detector and the second detector are worked, the phase adjustment circuit is configured to adjust one of the reference clock signal, the first clock signal and the second clock signal according to the second difference value.

An exemplary embodiment of the present disclosure further provides a memory storage device, which includes a connection interface unit, a rewritable non-volatile memory module and a memory control circuit unit. The connection interface unit is configured to be coupled to a host system. The memory control circuit unit is coupled to the connection interface unit and the rewritable non-volatile memory module. The clock and data recovery circuit module is coupled to the connection interface unit. The clock and data recovery circuit module includes a first detector, a second detector, a clock signal generation circuit and a phase adjustment circuit. The clock signal generation circuit is coupled to the first detector and the second detector. The phase adjustment circuit is coupled to the clock signal generation circuit. The first detector is configured to receive a reference clock signal and a first clock signal and detect a first difference value between the reference clock signal and the first clock signal. The second detector is configured to receive a data signal and a second clock signal and detect a second difference value between the data signal and the second clock signal. The clock signal generation circuit is configured to generate the first clock signal and the second clock signal according to one of the first difference value and the second difference value, a frequency of the second clock signal is higher than a frequency of the first clock signal. During a time period in which the first detector and the second detector are worked, the phase adjustment circuit is configured to adjust one of the reference clock signal, the first clock signal and the second clock signal according to the second difference value.

An exemplary embodiment of the present disclosure further provides a signal calibration method, which includes: receiving a reference clock signal and a first clock signal and detecting a first difference value between the reference clock signal and the first clock signal by a first detector; receiving a data signal and a second clock signal and detect a second difference value between the data signal and the second clock signal by a second detector; generating the first clock signal and the second clock signal according to one of the first difference value and the second difference value, wherein a frequency of the second clock signal is higher than a frequency of the first clock signal; and during a time period in which the first detector and the second detector are worked, adjusting one of the reference clock signal, the first clock signal and the second clock signal according to the second difference value.

On the basis above, the first detector is configured to detect the first difference value between the reference clock signal and the first clock signal, and the second detector is configured to detect the second difference value between the data signal and the second clock signal. The clock signal generation circuit is configured to generate the first clock signal and the second clock signal according to the first difference value or the second difference value, wherein the frequency of the second clock signal is higher than the frequency of the first clock signal. In particular, during a time period in which the first detector or the second detector are both worked, the second difference value is used to adjust the reference clock signal, the first clock signal or the second clock signal. Therefore, the overall signal calibration efficiency may be effectively improved.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" may be used interchangeably herein.

A plurality of exemplary embodiments are provided below to describe the disclosure, though the disclosure is not limited to the provided exemplary embodiments, and the exemplary embodiments may also be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, a term "signal" refers to at least a current, a voltage, an electric charge, a temperature, data or any other one or a plurality of signals.

Figure 1:
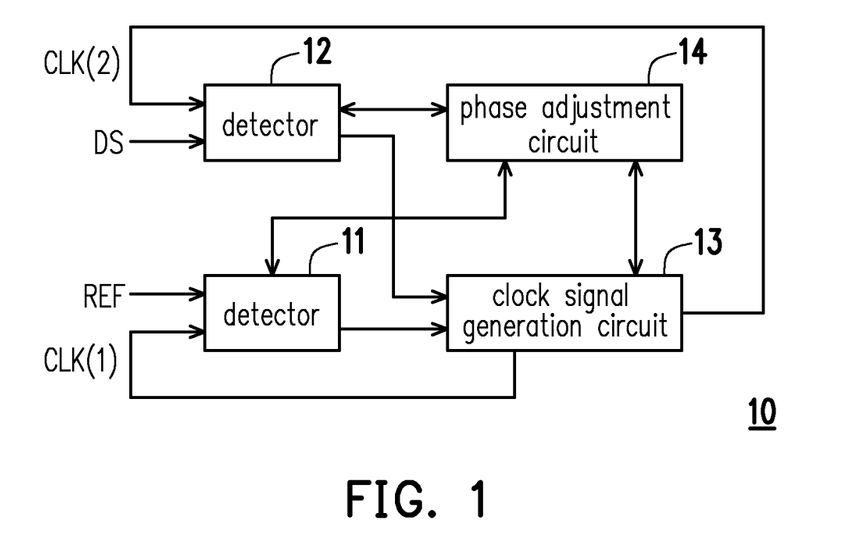
FIG. 1 is a schematic diagram of a clock and data recovery circuit module according to an exemplary embodiment of the present disclosure.

FIG. 1 is a schematic diagram of a clock and data recovery circuit module according to an exemplary embodiment of the present disclosure. Referring to FIG. 1, a clock and data recovery (CDR) circuit module 10 includes a detector 11 (also referred to as a first detector), a detector 12 (also referred to as a second detector), a clock signal generation circuit 13 and a phase adjustment circuit 14. The clock signal generation circuit 13 is coupled to the detector 11, the detector 12 and the phase adjustment circuit 14.

The detector 11 is configured to receive a signal REF (also referred to as a reference clock signal) and a signal CLK(1) (also referred to as a first clock signal). The detector 11 is further configured to detect a difference value (also referred to as a first difference value) between the signals REF and CLK(1). For example, the first difference value may reflect a frequency difference (and/or a phase difference) between the signals REF and CLK(1). For example, the detector 11 may include a frequency phase detector.

The detector 12 is configured to receive a signal DS (also referred to as a data signal) and a signal CLK(2) (also referred to as a second clock signal). The detector 12 is configured to detect a difference value (also referred to as a second difference value) between the signals DS and CLK(2). For example, the second difference value may reflect a phase difference between the signals DS and CLK(2). For example, detector 12 may include a phase detector.

The clock signal generation circuit 13 is configured to generate the signals CLK(1) and CLK(2) according to one of the first difference value and the second difference value. It should be noted that, a frequency of the signal CLK(2) is higher than a frequency of the signal CLK(1). For example, at a certain time point, the clock signal generation circuit 13 may generate signals CLK(1) and CLK(2) according to the first difference value. At another time point, the clock signal generation circuit 13 may switch to generate signals CLK(1) and CLK(2) according to the second difference value.

In addition, during a time period in which the detectors 11 and 12 are both worked, the phase adjustment circuit 14 is configured to adjust the signal REF, CLK(1) or CLK(2) according to the second difference value to improve the overall signal calibration efficiency of the CDR circuit module 10. It should be noted that, the signal adjustment mechanism used by the phase adjustment circuit 14 is different from the signal adjustment mechanism used by the clock signal generation circuit 13.

In an exemplary embodiment, the signal adjustment mechanism used by the clock signal generation circuit 13 may include adjusting the frequencies or phases of the signals CLK(1) and CLK(2) by controlling an oscillation frequency of a voltage controlled oscillator in the clock signal generation circuit 13. However, the phase adjustment circuit 14 may adjust the phase of the signal REF, CLK(1) or CLK(2) by performing a phase interpolation on the signal REF, CLK(1) or CLK(2). From another perspective, the adjustment of the signal REF, CLK(1) or CLK(2) performed by the phase adjustment circuit 14 may not involve a control of the voltage controlled oscillator in the clock signal generation circuit 13.

Traditionally, even if the CDR circuit module includes both of the detectors 11 and 12, the CDR circuit module usually first calibrates the frequency of the signal CLK(1) according to the output of the detector 11. After the frequency calibration of the signal CLK(1) is finished, the phase of the signal CLK(2) is then calibrated according to the output of the detector 12 to try to lock the phase of the signal CLK(2) to the preset lock point of the signal DS. However, this kind of signal calibration lacks efficiency.

In an exemplary embodiment, during a time period in which the detectors 11 and 12 are both worked, the phase adjustment circuit 14 may adjust the signal REF, CLK(1) or CLK(2) according to the output (which reflects the second difference value) of the detector 12. Thereby, during the time period when the clock signal generation circuit 13 calibrates the signal CLK(1) according to the output of the detector 11, the phase of the signal CLK(2) may be synchronously calibrated (i.e., locked) to the preset lock point of the signal DS. Therefore, compared with the traditional means which spends more time to sequentially calibrate the signals CLK(1) and CLK(2), the adoption of the phase adjustment circuit 14 may effectively improve the overall signal calibration efficiency of the CDR circuit module 10.

Figure 2:
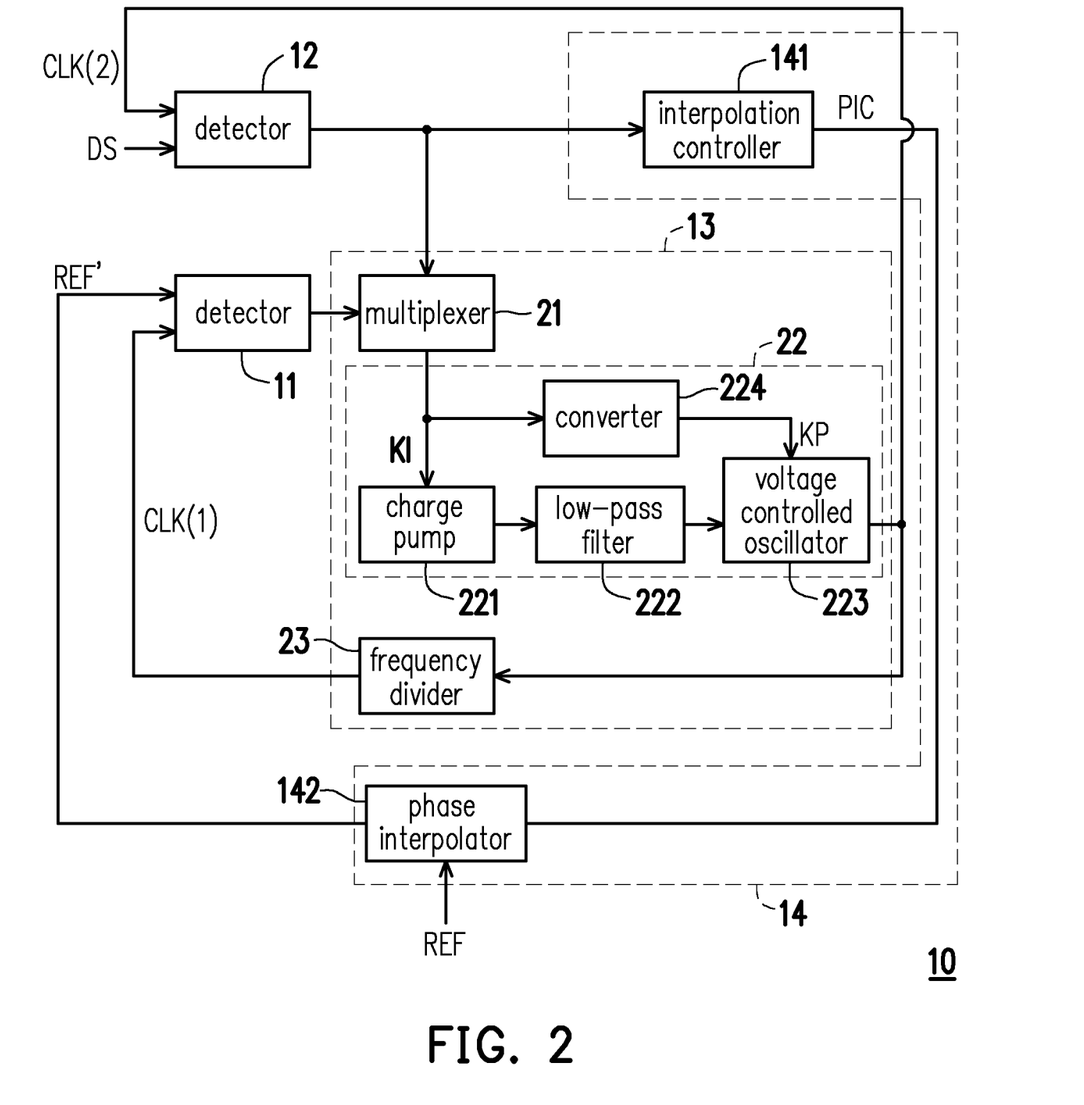
FIG. 2 is a schematic diagram of a clock and data recovery circuit module according to an exemplary embodiment of the present disclosure.

FIG. 2 is a schematic diagram of a CDR circuit module according to an exemplary embodiment of the present disclosure. Referring to FIG. 2, in an exemplary embodiment, the clock signal generation circuit 13 includes a multiplexer 21, a clock signal generator 22 and a frequency divider 23. The clock signal generator 22 is coupled to the multiplexer 21 and the frequency divider 23.

The multiplexer 21 is configured to receive the output (also referred to as a first output) of the detector 11 and the output (also referred to as a second output) of the detector 12. The first output reflects the first difference value. The second output reflects the second difference value. The multiplexer 21 may generate an output (also referred to as a third output) according to the first output or the second output. For example, in a certain state (also referred to as the first state), a signal path (also referred to as a first signal path) between the detector 11 and the clock signal generator 22 may be conducted by the multiplexer 21, and the multiplexer 21 may generate the third output according to the first output. Alternatively, in another state (also referred to as a second state), a signal path (also referred to as a second signal path) between the detector 12 and the clock signal generator 22 may be conducted by the multiplexer 21, and the multiplexer 21 may generate the third output according to the second output.

The clock signal generator 22 is configured to generate the signal CLK(2) according to the output (i.e., the third output) of the multiplexer 21. For example, the third output may be used to influence, control or adjust the frequency (and/or phase) of signal CLK(2). Then, the frequency divider 23 is configured to generate the signal CLK(1) according to the signal CLK(2). For example, the frequency divider 23 may divide the signal CLK(2) (i.e., reduce the frequency of the signal CLK(2)) to generate the signal CLK(1), and the frequency of the signal CLK(1) is lower than the frequency of the signal CLK(2).

In an exemplary embodiment, the clock signal generator 22 may include a charge pump 221, a low-pass filter 222, a voltage controlled oscillator 223 and a converter 224. The charge pump 221 and the converter 224 are coupled to an output terminal of the multiplexer 21. The low-pass filter 222 is coupled between the charge pump 221 and the voltage controlled oscillator 223. The voltage controlled oscillator 223 is coupled to the output terminals of the low-pass filter 222 and the converter 224.

In an exemplary embodiment, the charge pump 221 and the low-pass filter 222 may form a control path (also referred to as a first control path) between the multiplexer 21 and the voltage controlled oscillator 223 to control the voltage controlled oscillator 223 to generate the signal CLK(2). For example, on the first control path, the charge pump 221 may obtain a signal KI (also referred to as an integral gain control signal) from the output (i.e., the third output) of the multiplexer 21. On the first control path, the charge pump 221 and the low-pass filter 222 may control the voltage controlled oscillator 223 to generate the corresponding signal CLK(2) according to the signal KI. In an exemplary embodiment, the charge pump 221 and the low-pass filter 222 may be implemented as an integral gain converter (also referred to as Ki converter).

In an exemplary embodiment, the converter 224 may form another control path (also referred to as a second control path) between the multiplexer 21 and the voltage controlled oscillator 223 to control the voltage controlled oscillator 223 to generate the signal CLK(2). For example, on the second control path, the converter 224 may generate a signal KP (also referred to as the proportional gain control signal) according to the output (i.e., the third output) of the multiplexer 21. On the second control path, the converter 224 may control the voltage controlled oscillator 223 through the signal KP to generate the corresponding signal CLK(2). In an exemplary embodiment, the converter 224 may be implemented as a proportional gain converter (also referred to as Kp converter).

In an exemplary embodiment, the clock signal generator 22 may control the voltage controlled oscillator 223 through the first control path alone to generate the corresponding signal CLK(2). In an exemplary embodiment, the clock signal generator 22 may control the voltage controlled oscillator 223 through the second control path alone to generate the corresponding signal CLK(2). In an exemplary embodiment, the clock signal generator 22 may control the voltage controlled oscillator 223 to generate the corresponding signal CLK(2) through the first control path and the second control path, simultaneously.

In an exemplary embodiment, the phase adjustment circuit 14 includes an interpolation controller 141 and a phase interpolator 142. The interpolation controller 141 is coupled to the detector 12 to receive the output (i.e., the second output) of the detector 12. The interpolation controller 141 may generate a control code PIC (also referred to as a phase interpolation control code) according to the second output (or the second difference value). For example, the interpolation controller 141 may generate a specific control code PIC according to a specific second difference value. In addition, the interpolation controller 141 may generate different control code PICs according to different second difference values. The phase interpolator 142 is coupled to the interpolation controller 141 and the detector 11. The phase interpolator 142 may receive the control code PIC and the signal REF and adjust the phase of the signal REF according to the control code PIC.

More specifically, in the exemplary embodiment of FIG. 2, before inputting the signal REF to the detector 11, the interpolation controller 141 may adjust the phase of the signal REF to be input to the detector 11 according to the second output (or the second difference value). For example, after the interpolation controller 141 generates the control code PIC according to the second output (or the second difference value), the phase interpolator 142 may perform a phase interpolation on the signal REF according to the control code PIC to generate the signal REF'. The phase of signal REF' is different from the phase of signal REF. The signal REF' may be used to replace the original signal REF and then be provided to the detector 11. Thereafter, the detector 11 may detect the first difference value between the signals REF' and CLK(1) and generate the first output.

In other words, in the exemplary embodiment of FIG. 2, the second difference value (e.g., the phase difference) between the signals CLK(2) and DS may be reflected into the signal REF to obtain the signal REF' without going through (or the using of) the clock signal generator 22. Thereafter, the clock signal generation circuit 13 may calibrate the frequency of the signal CLK(1) and the phase of the signal CLK(2), synchronously, according to the output (i.e., the first output) of the detector 11 and the output (i.e., the second output) of the detector 12. In this way, the overall signal calibration efficiency of the CDR circuit module 10 may be effectively improved.

Figure 3:
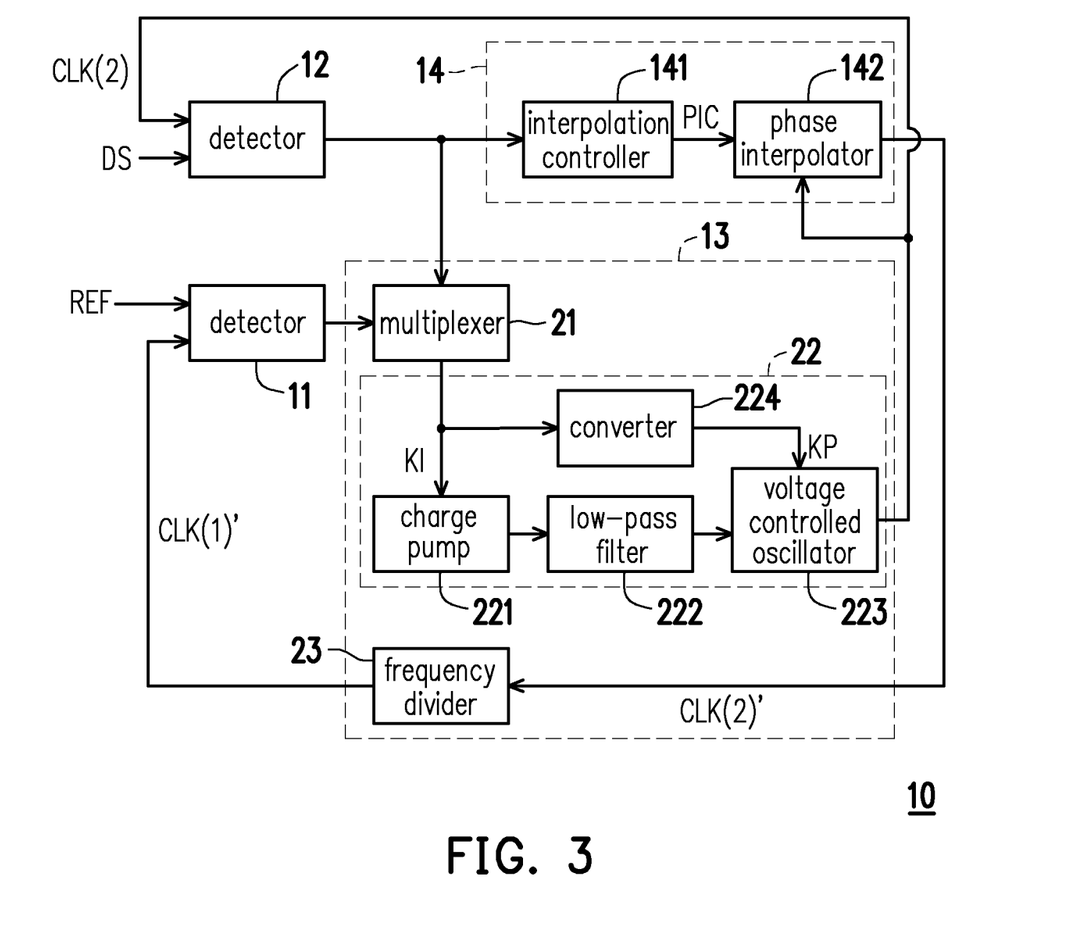
FIG. 3 is a schematic diagram of a clock and data recovery circuit module according to an exemplary embodiment of the present disclosure.

FIG. 3 is a schematic diagram of a CDR circuit module according to an exemplary embodiment of the present disclosure. Referring to FIG. 3, in an exemplary embodiment, the phase interpolator 142 may receive the control code PIC and the signal CLK(2) and adjust the phase of the signal CLK(2) according to the control code PIC.

More specifically, in the exemplary embodiment of FIG. 3, before inputting the signal CLK(1) to the detector 11, the interpolation controller 141 may adjust the phase of the signal CLK(1) to be input to the detector 11 according to the second output (or the second difference value). For example, after the interpolation controller 141 generates the control code PIC according to the second output (or the second difference value), the phase interpolator 142 may perform the phase interpolation on the signal CLK(2) according to the control code PIC to generate the signal CLK(2)'. The phase of signal CLK(2)' is different from the phase of the signal CLK(2). The frequency divider 23 may generate the signal CLK(1)' according to the signal CLK(2)'. For example, frequency divider 23 may divide the signal CLK(2)' (i.e., reduce the frequency of the signal CLK(2)') to generate the signal CLK(1)', and the frequency of the signal CLK(1)' is lower than the frequency of the signal CLK(2)'. The signal CLK(1)' may be used to replace the original signal CLK(1) and then be provided to the detector 11. Thereafter, the detector 11 may detect the first difference value between the signals REF and CLK(1)' and generate the first output.

In other words, in the exemplary embodiment of FIG. 3, the second difference value (e.g., the phase difference) between the signals CLK(2) and DS may be reflected into the signal CLK(1) to obtain the signal CLK(1)' without going through (or the using of) the clock signal generator 22. Thereafter, the clock signal generation circuit 13 may calibrate the frequency of the signal CLK(1)' and the phase of the signal CLK(2), synchronously, according to the output (i.e., the first output) of the detector 11 and the output (i.e., the second output) of the detector 12. In this way, the overall signal calibration efficiency of the CDR circuit module 10 may be effectively improved. For the remaining operational details of FIG. 3, reference may be made to the description of the exemplary embodiment of FIG. 2 and will not be repeated here.

Figure 4:
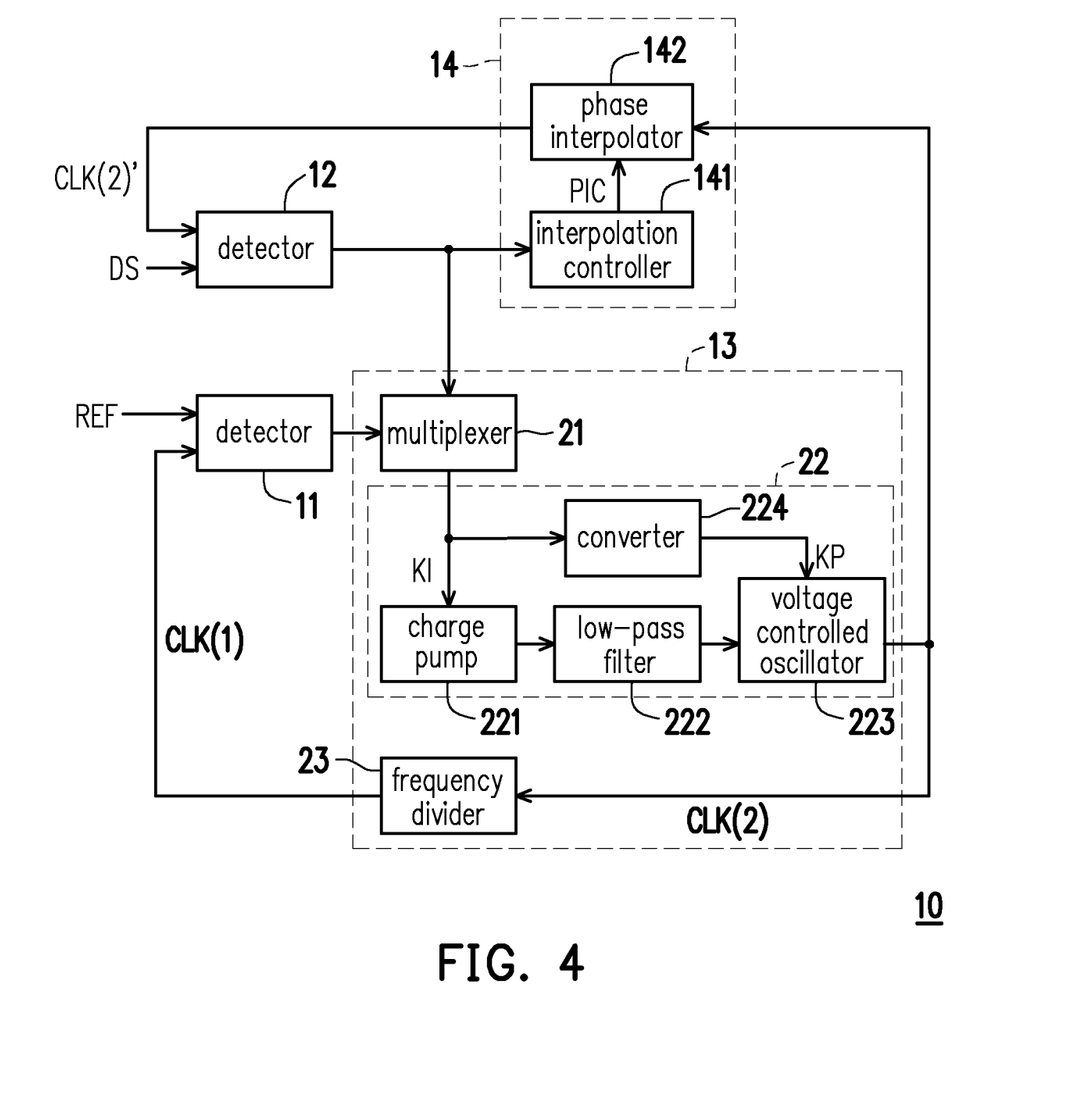
FIG. 4 is a schematic diagram of a clock and data recovery circuit module according to an exemplary embodiment of the present disclosure.

FIG. 4 is a schematic diagram of a CDR circuit module according to an exemplary embodiment of the present disclosure. Referring to FIG. 4, in an exemplary embodiment, the phase interpolator 142 may receive the control code PIC and the signal CLK(2) and adjust the phase of the signal CLK(2) according to the control code PIC.

More specifically, in the exemplary embodiment of FIG. 4, before inputting the signal CLK(2) to the detector 12, the interpolation controller 141 may adjust the phase of the signal CLK(2) to be input to the detector 12 according to the second output (or the second difference value). For example, after the interpolation controller 141 generates the control code PIC according to the second output (or the second difference value), the phase interpolator 142 may perform the phase interpolation on the signal CLK(2) according to the control code PIC to generate the signal CLK(2)'. The phase of signal CLK(2)' is different from the phase of signal CLK(2). The signal CLK(2)' may be used to replace the original signal CLK(2) and then be provided to the detector 12. Thereafter, the detector 12 may detect the second difference value between the signals DS and CLK(2)' and generate the second output.

In other words, in the exemplary embodiment of FIG. 4, the second difference value (e.g., the phase difference) between the signals CLK(2) and DS may be reflected into the signal CLK(2) to obtain the signal CLK(2)' without going through (or the using of) the clock signal generator 22. Thereafter, the clock signal generation circuit 13 may calibrate the frequency of the signal CLK(1) and the phase of the signal CLK(2), synchronously, according to the output (i.e., the first output) of the detector 11 and the output (i.e., the second output) of the detector 12. In this way, the overall signal calibration efficiency of the CDR circuit module 10 may be effectively improved. For the remaining operational details of FIG. 4, reference may be made to the description of the exemplary embodiment of FIG. 2 and will not be repeated here.

It should be noted that, in the exemplary embodiments of FIG. 2 to FIG. 4, the phase adjustment circuit 14 obtains the second difference value according to the output (i.e., the second output) of the detector 12. However, in another exemplary embodiment, the phase adjustment circuit 14 may obtain the second difference value from the output (i.e., the third output) of the multiplexer 21.

Figure 5:
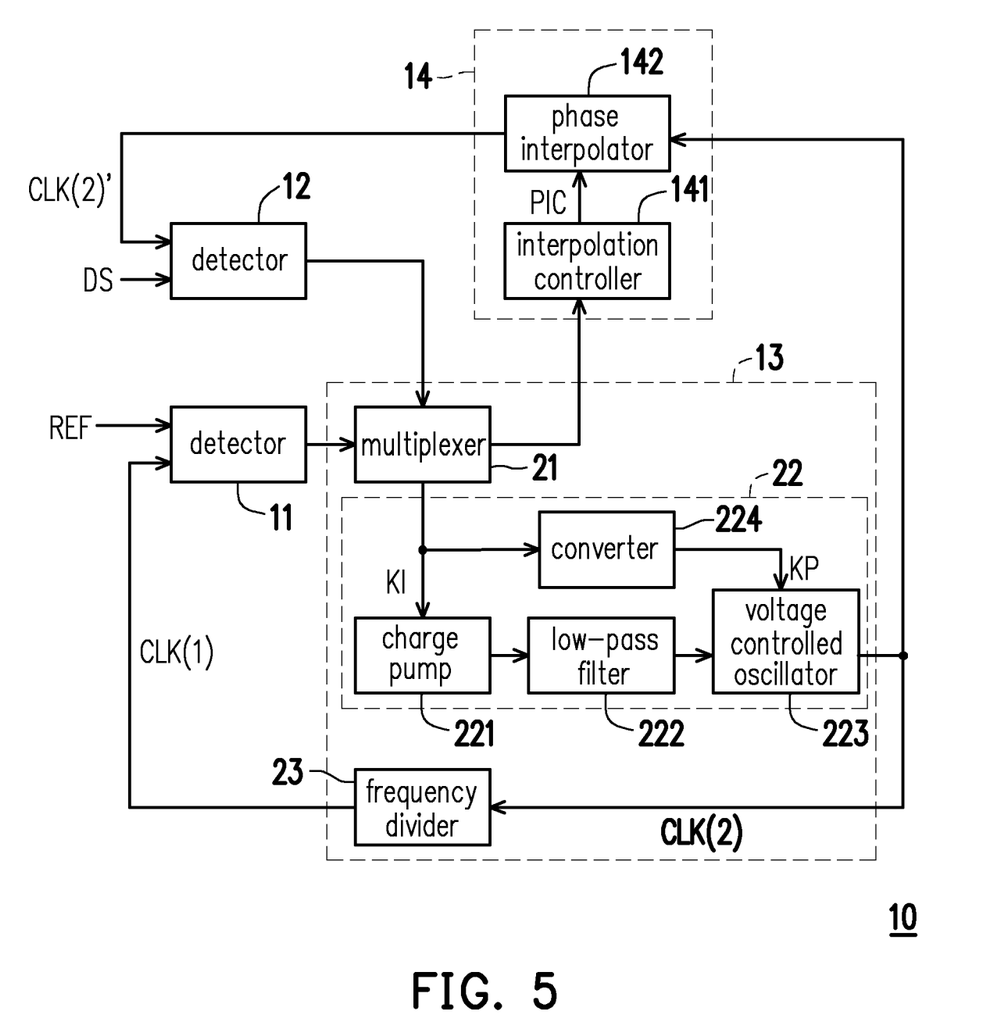
FIG. 5 is a schematic diagram of a clock and data recovery circuit module according to an exemplary embodiment of the present disclosure.

FIG. 5 is a schematic diagram of a CDR circuit module according to an exemplary embodiment of the present disclosure. Referring to FIG. 5, in an exemplary embodiment, the interpolation controller 141 may be coupled to the multiplexer 21 to receive the output (i.e., the third output) of the multiplexer 21. The interpolation controller 141 may obtain the second difference value according to the third output and generate the control code PIC according to the second difference value. For the remaining operational details of FIG. 5, reference may be made to the descriptions of the exemplary embodiments of FIG. 2 to FIG. 4, and will not be repeated here. In an exemplary embodiment, the phase adjustment circuit 14 is configured to operate according to the output of the multiplexer 21 (for example, the interpolation controller 141 generates the control code PIC according to the third output), thereby obtaining the advantages including reducing of the circuit layout area and/or increasing of the automation operation efficiency.

In an exemplary embodiment, the phase adjustment circuit 14 may further adjust the signal REF, CLK(1) or CLK(2) according to the currently measured temperature value. Taking FIG. 2 as an example, according to the currently measured temperature value, the interpolation controller 141 may select a control code (also referred to as a target control code) matched with the second difference value from multiple candidate control codes. For example, these candidate control codes include a control code (also referred to as a first control code) corresponding to a certain temperature value (also referred to as a first temperature value) and a control code (also referred to as a second control code) corresponding to another temperature value (also referred to as a second temperature value). In response to the currently measured temperature value being the first temperature value, the interpolation controller 141 may set the first control code as the target control code. Alternatively, in response to the currently measured temperature value being the second temperature value, the interpolation controller 141 may set the second control code as the target control code. Then, the interpolation controller 141 may generate the control code PIC according to the target control code. That is, when the environment temperature or the device temperature changes, the phase adjustment circuit 14 may dynamically adjust the control code PIC. Thereby, under different temperature conditions, the CDR circuit module 10 may calibrate the signals CLK(1) and/or CLK(2) in the most efficient way.

Figure 6:
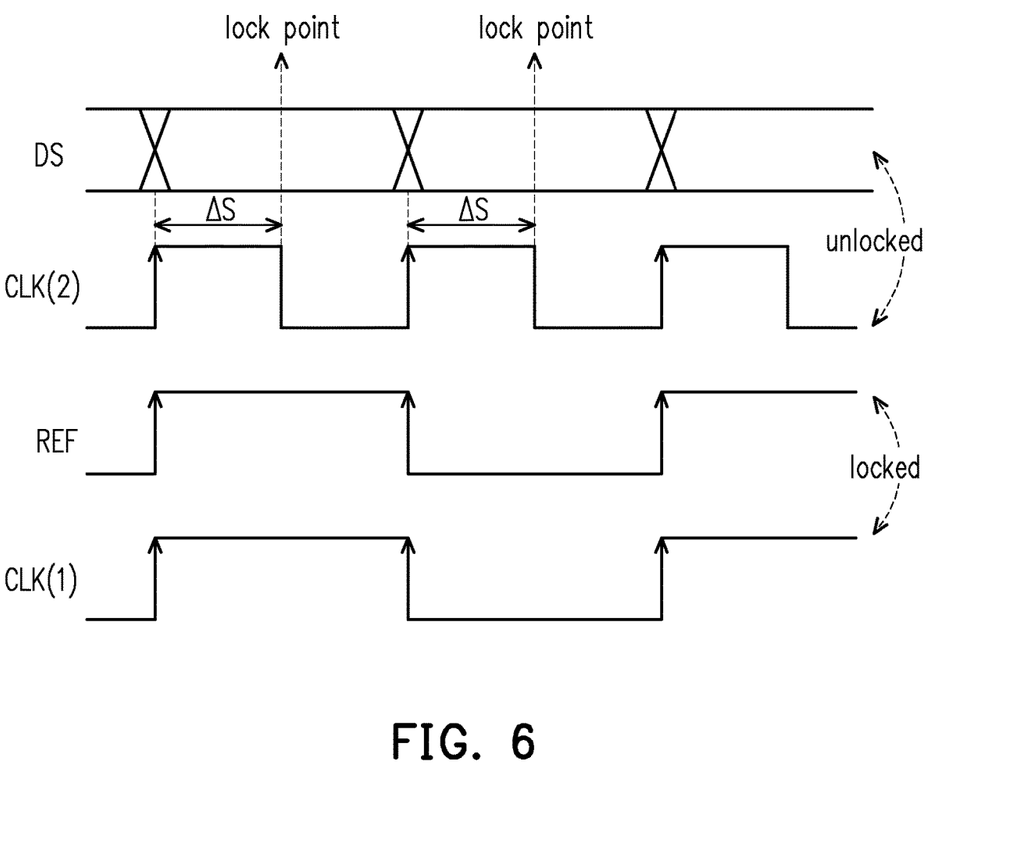
FIG. 6 is a schematic diagram of a traditional calibration of the first clock signal and the second clock signal in sequential.

FIG. 6 is a schematic diagram of a traditional calibration of the first clock signal and the second clock signal in sequential. Referring to FIG. 6, in traditional, in the CDR circuit module, the frequency of the signal CLK(1) (i.e., the first clock signal) is first calibrated to be consistent with the frequency of the signal REF (i.e., the reference clock signal). After completing the calibration of the signal CLK(1) (i.e., the signal CLK(1) is locked with the signal REF), there is still a phase offset ΔS between the signal CLK(2) (i.e., the second clock signal) and the signal DS (i.e., the data signal). Therefore, after completing the calibration of the signal CLK(1) (i.e., the signal CLK(1) is locked with the signal REF), the calibration of the signal CLK(2) needs to be continued to lock the signal CLK(2) to the preset lock point of the signal DS. Therefore, in traditional, it takes more time to sequentially calibrate the signals CLK(1) and CLK(2).

Figure 7:
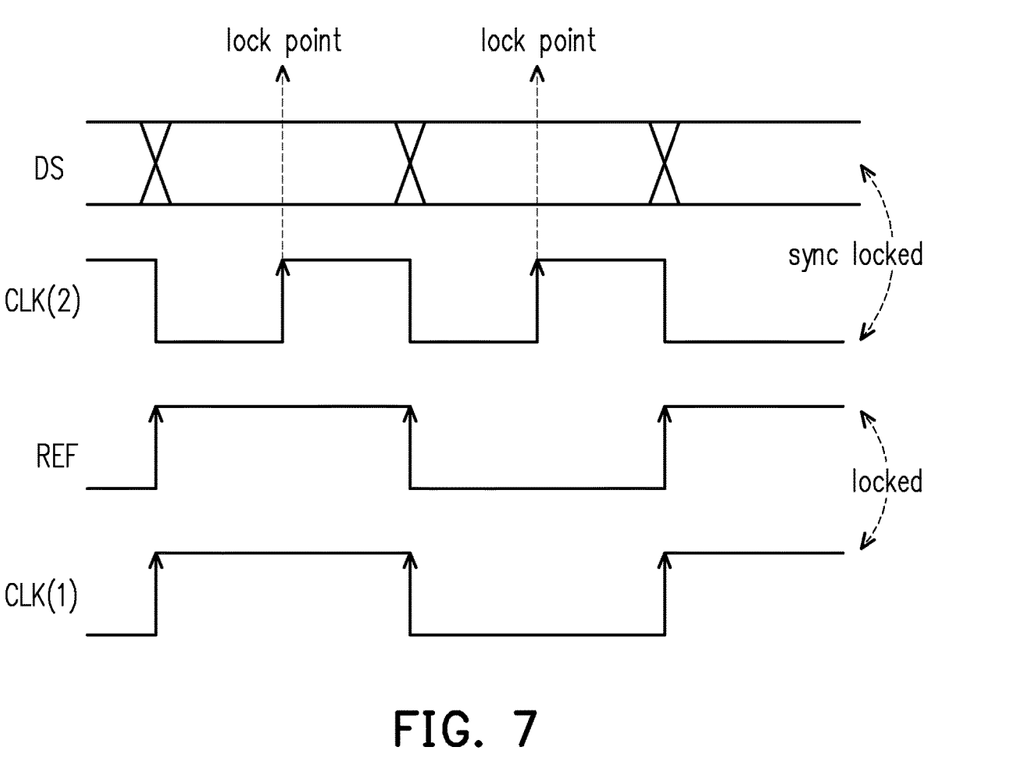
FIG. 7 is a schematic diagram of synchronously calibrating the first clock signal and the second clock signal according to an exemplary embodiment of the present disclosure.

FIG. 7 is a schematic diagram of synchronously calibrating the first clock signal and the second clock signal according to an exemplary embodiment of the present disclosure. Referring to FIG. 1 and FIG. 7, in an exemplary embodiment, during a time period in which the detectors 11 and 12 are both worked, through adjusting of the signal REF, CLK(1) or CLK(2) by the phase adjustment circuit 14, the calibration and locking of the signal CLK(2) (i.e., locking the signal CLK(2) to the preset lock point of the signal DS) may be finished synchronously in a time period in which the calibration of the signal CLK(1) is performed by the phase adjustment circuit 14. In this way, the overall signal calibration efficiency of the CDR circuit module 10 may be effectively improved.

In an exemplary embodiment, the CDR circuit module 10 of FIG. 1 may be disposed in a memory storage device. However, in an exemplary embodiment, the CDR circuit module 10 of FIG. 1 may be disposed in other types of electronic devices different from the memory storage device.

Figure 8:
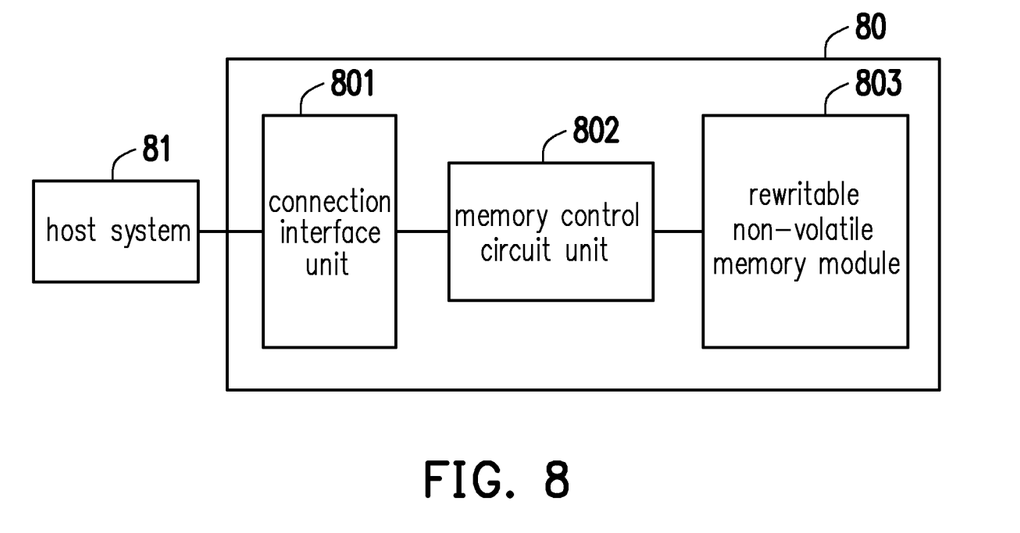
FIG. 8 is a schematic diagram of a memory storage device according to an exemplary embodiment of the present disclosure.

FIG. 8 is a schematic diagram of a memory storage device according to an exemplary embodiment of the present disclosure. Referring to FIG. 8, a memory storage device 80 may be used with host system 81. The host system 81 may write data to or read data from the memory storage device 80. For example, the host system 81 may be any system that may actually cooperate with the memory storage device 80 to store data, such as a desktop computer, a notebook computer, a smart phone, a tablet computer, or a vehicle-mounted computer. The present disclosure does not limit the types of the host system 81 and the memory storage device 80.

The memory storage device 80 includes a connection interface unit 801, a memory control circuit unit 802 and a rewritable non-volatile memory module 803. In particular, the CDR circuit module 10 of FIG. 1 may be disposed in the memory storage device 80. For example, the CDR circuit module 10 may be coupled to the connection interface unit 801.

The connection interface unit 801 is configured to couple the memory storage device 80 to the host system 81. For example, the connection interface unit 801 may be compatible with the Peripheral Component Interconnect Express (PCI Express) standard, the Serial Advanced Technology Attachment (SATA) standard, the Parallel Advanced Technology Attachment (PATA) standard, Universal Serial Bus (USB) standard or other suitable standard.

The memory control circuit unit 802 is coupled to the connection interface unit 801 and the rewritable non-volatile memory module 803. The memory control circuit unit 802 may communicate with the host system 81 through the connection interface unit 801 (e.g., exchange signals with the host system 81). In addition, the memory control circuit unit 802 may access the rewritable non-volatile memory module 803 according to the instructions of the host system 81. For example, the memory control circuit unit 802 may write, read, and erase data in the rewritable non-volatile memory module 803 according to the instructions of the host system 81. For example, the memory control circuit unit 802 may include a memory controller.

The rewritable non-volatile memory module 803 is configured to store data written by the host system 81. For example, the rewritable non-volatile memory module 803 may include a single-level memory cell (Single Level Cell, SLC) NAND flash memory module (that is, a flash memory module that may store 1 bit in one memory cell), a multi-level memory cell (Multi Level Cell, MLC) NAND flash memory module (that is, a flash memory module that may store 2 bits in one memory cell), a triple-level memory cell (Triple Level Cell, TLC) NAND flash memory module (that is, a flash memory module that may store 3 bits in one memory cell), a quad-level memory cell (Quad Level Cell, QLC) NAND flash memory module (that is, a flash memory module that may store 4 bits in one memory cell), other types of flash memory modules, or other memory modules with the same or similar characteristics.

Figure 9:
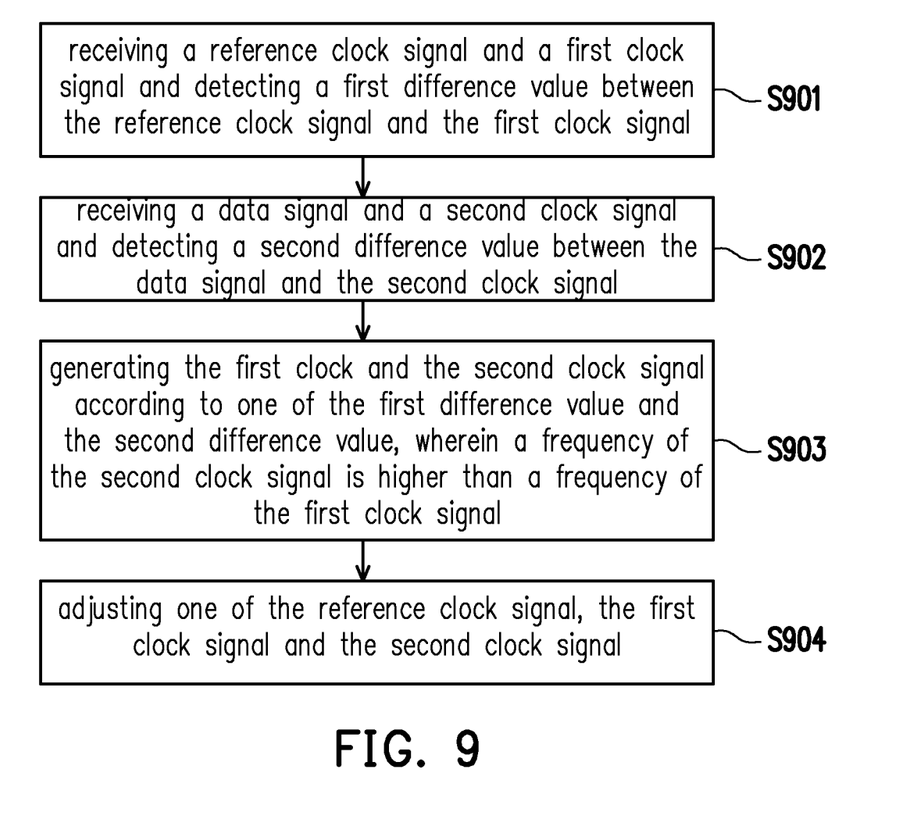
FIG. 9 is a flow chart of a signal calibration method according to an exemplary embodiment of the present disclosure.

FIG. 9 is a flow chart of a signal calibration method according to an exemplary embodiment of the present disclosure. Referring to FIG. 9, in step S901, the first detector receives the reference clock signal and the first clock signal and detects the first difference value between the reference clock signal and the first clock signal. In step S902, the second detector receives the data signal and the second clock signal and detects the second difference value between the data signal and the second clock signal. In step S903, the first clock signal and the second clock signal are generated according to one of the first difference value and the second difference value, wherein the frequency of the second clock signal is higher than the frequency of the first clock signal. In step S904, during a time period in which the first detector and the second detector are both worked, one of the reference clock signal, the first clock signal and the second clock signal is adjusted according to the second difference value.

However, each step in FIG. 9 has been described in detail above and will not be described again here. Each step in FIG. 9 may be implemented as program codes or circuits, and the present disclosure is not limited thereto. In addition, the method in FIG. 9 may be used in conjunction with the above exemplary embodiments or may be used alone, and is not limited by the present disclosure.

In summary, the CDR circuit module, the memory storage device and the signal calibration method proposed by the exemplary embodiments of the present disclosure may adjust the reference clock signal, the first clock signal or the second clock signal by additionally configured phase adjustment circuit during a time period in which the first detector and the second detector are both worked. In this way, the calibration and locking of the second clock signal may be completed simultaneously during the time period when the first clock signal is calibrated by the preset clock signal generation circuit. Therefore, the overall signal calibration efficiency of the CDR circuit module may be effectively improved.

The previously described exemplary embodiments of the present disclosure have the advantages aforementioned, wherein the advantages aforementioned not required in all versions of the disclosure.

It will be apparent to those skilled in the art that various modifications and variations may be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A clock and data recovery circuit module, comprising:
a first detector;
a second detector;
a clock signal generation circuit, coupled to the first detector and the second detector; and
a phase adjustment circuit, coupled to the clock signal generation circuit,
wherein the first detector is configured to receive a reference clock signal and a first clock signal and detect a first difference value between the reference clock signal and the first clock signal,
the second detector is configured to receive a data signal and a second clock signal and detect a second difference value between the data signal and the second clock signal,
the clock signal generation circuit is configured to generate the first clock signal and the second clock signal according to one of the first difference value and the second difference value, a frequency of the second clock signal is higher than a frequency of the first clock signal, and
during a time period in which the first detector and the second detector are worked, the phase adjustment circuit is configured to adjust one of the reference clock signal, the first clock signal and the second clock signal according to the second difference value.

2. The clock and data recovery circuit module according to claim 1, wherein the clock signal generation circuit comprises:
a multiplexer, coupled to the first detector and the second detector;
a clock signal generator, coupled to the multiplexer; and
a frequency divider, coupled to the clock signal generator,
wherein the multiplexer is configured to generate a third output according to one of a first output of the first detector and a second output of the second detector,
the clock signal generator is configured to generate the second clock signal according to the third output, and
the frequency divider is configured to generate the first clock signal according to the second clock signal.

3. The clock and data recovery circuit module according to claim 2, wherein in a first state, the multiplexer is configured to generate the third output according to the first output, and
in a second state, the multiplexer is configured to generate the third output according to the second output.

4. The clock and data recovery circuit module according to claim 2, wherein the clock signal generator comprises:
a charge pump, coupled to the multiplexer;
a low-pass filter, coupled to the charge pump;
a converter, coupled to the multiplexer; and
a voltage controlled oscillator, coupled to the low-pass filter and the converter,
wherein the charge pump and the low-pass filter form a first control path between the multiplexer and the voltage controlled oscillator to control the voltage controlled oscillator to generate the second clock signal, and
the converter forms a second control path between the multiplexer and the voltage controlled oscillator to control the voltage controlled oscillator to generate the second clock signal.

5. The clock and data recovery circuit module according to claim 1, wherein the operation of adjusting, by the phase adjustment circuit, the one of the reference clock signal, the first clock signal and the second clock signal according to the second difference value comprises:
before the reference clock signal is input to the first detector, adjusting, according to the second difference value, a phase of the reference clock signal to be input to the first detector.

6. The clock and data recovery circuit module according to claim 1, wherein the operation of adjusting, by the phase adjustment circuit, the one of the reference clock signal, the first clock signal and the second clock signal according to the second difference value comprises:
before the first clock signal is input to the first detector, adjusting, according to the second difference value, a phase of the first clock signal to be input to the first detector.

7. The clock and data recovery circuit module according to claim 1, wherein the operation of adjusting, by the phase adjustment circuit, the one of the reference clock signal, the first clock signal and the second clock signal according to the second difference value comprises:
before the second clock signal is input to the second detector, adjusting, according to the second difference value, a phase of the second clock signal to be input to the second detector.

8. The clock and data recovery circuit module according to claim 1, wherein the phase adjustment circuit is further configured to:

adjust the one of the reference clock signal, the first clock signal and the second clock signal according to a temperature value.

9. A memory storage device, comprising:
a connection interface unit, configured to be coupled to a host system;
a rewritable non-volatile memory module;
a memory control circuit unit, coupled to the connection interface unit and the rewritable non-volatile memory module; and
a clock and data recovery circuit module, coupled to the connection interface unit,
wherein the clock and data recovery circuit module comprises:
a first detector;
a second detector;
a clock signal generation circuit, coupled to the first detector and the second detector; and
a phase adjustment circuit, coupled to the clock signal generation circuit,
wherein the first detector is configured to receive a reference clock signal and a first clock signal and detect a first difference value between the reference clock signal and the first clock signal,
the second detector is configured to receive a data signal and a second clock signal and detect a second difference value between the data signal and the second clock signal,
the clock signal generation circuit is configured to generate the first clock signal and the second clock signal according to one of the first difference value and the second difference value, a frequency of the second clock signal is higher than a frequency of the first clock signal, and
during a time period in which the first detector and the second detector are worked, the phase adjustment circuit is configured to adjust one of the reference clock signal, the first clock signal and the second clock signal according to the second difference value.

10. The memory storage device according to claim 9, wherein the clock signal generation circuit comprises:
a multiplexer, coupled to the first detector and the second detector;
a clock signal generator, coupled to the multiplexer; and
a frequency divider, coupled to the clock signal generator,
wherein the multiplexer is configured to generate a third output according to one of a first output of the first detector and a second output of the second detector,
the clock signal generator is configured to generate the second clock signal according to the third output, and
the frequency divider is configured to generate the first clock signal according to the second clock signal.

11. The memory storage device according to claim 10, wherein in a first state, the multiplexer is configured to generate the third output according to the first output, and
in a second state, the multiplexer is configured to generate the third output according to the second output.

12. The memory storage device according to claim 10, wherein the clock signal generator comprises:
a charge pump, coupled to the multiplexer;
a low-pass filter, coupled to the charge pump;
a converter, coupled to the multiplexer; and
a voltage controlled oscillator, coupled to the low-pass filter and the converter,
wherein the charge pump and the low-pass filter form a first control path between the multiplexer and the voltage controlled oscillator to control the voltage controlled oscillator to generate the second clock signal, and
the converter forms a second control path between the multiplexer and the voltage controlled oscillator to control the voltage controlled oscillator to generate the second clock signal.

13. The memory storage device according to claim 9, wherein the operation of adjusting, by the phase adjustment circuit, the one of the reference clock signal, the first clock signal and the second clock signal according to the second difference value comprises:
before the reference clock signal is input to the first detector, adjusting, according to the second difference value, a phase of the reference clock signal to be input to the first detector.

14. The memory storage device according to claim 9, wherein the operation of adjusting, by the phase adjustment circuit, the one of the reference clock signal, the first clock signal and the second clock signal according to the second difference value comprises:
before the first clock signal is input to the first detector, adjusting, according to the second difference value, a phase of the first clock signal to be input to the first detector.

15. The memory storage device according to claim 9, wherein the operation of adjusting, by the phase adjustment circuit, the one of the reference clock signal, the first clock signal and the second clock signal according to the second difference value comprises:
before the second clock signal is input to the second detector, adjusting, according to the second difference value, a phase of the second clock signal to be input to the second detector.

16. The memory storage device according to claim 9, wherein the phase adjustment circuit is further configured to:
adjust the one of the reference clock signal, the first clock signal and the second clock signal according to a temperature value.

17. A signal calibration method, comprising:
receiving a reference clock signal and a first clock signal and detecting a first difference value between the reference clock signal and the first clock signal by a first detector;
receiving a data signal and a second clock signal and detecting a second difference value between the data signal and the second clock signal by a second detector;
generating the first clock signal and the second clock signal according to one of the first difference value and the second difference value, wherein a frequency of the second clock signal is higher than a frequency of the first clock signal; and
during a time period in which the first detector and the second detector are worked, adjusting one of the reference clock signal, the first clock signal and the second clock signal according to the second difference value.

18. The signal calibration method according to claim 17, wherein the step of generating the first clock signal and the second clock signal according to the one of the first difference value and the second difference value comprises:
generating a third output according to one of a first output of the first detector and a second output of the second detector by a multiplexer;
generating the second clock signal according to the third output; and
generating the first clock signal according to the second clock signal by a frequency divider.

19. The signal calibration method according to claim 18, wherein the step of generating the first clock signal and the second clock signal according to the one of the first difference value and the second difference value comprises:

in a first state, generating the third output according to the first output by the multiplexer; and in a second state, generating the third output according to the second output by the multiplexer.

20. The signal calibration method according to claim 18, wherein the step of generating the second clock signal according to the third output comprises:

forming, by a charge pump and a low-pass filter, a first control path between the multiplexer and a voltage controlled oscillator to control the voltage controlled oscillator to generate the second clock signal; and forming, by a converter, a second control path between the multiplexer and the voltage controlled oscillator to control the voltage controlled oscillator to generate the second clock signal.

21. The signal calibration method according to claim 17, wherein the step of adjusting the one of the reference clock signal, the first clock signal and the second clock signal according to the second difference value comprises:

before the reference clock signal is input to the first detector, adjusting, according to the second difference value, a phase of the reference clock signal to be input to the first detector.

22. The signal calibration method according to claim 17, wherein the step of adjusting the one of the reference clock signal, the first clock signal and the second clock signal according to the second difference value comprises:

before the first clock signal is input to the first detector, adjusting, according to the second difference value, a phase of the first clock signal to be input to the first detector.

23. The signal calibration method according to claim 17, wherein the step of adjusting the one of the reference clock signal, the first clock signal and the second clock signal according to the second difference value comprises:

before the second clock signal is input to the second detector, adjusting, according to the second difference value, a phase of the second clock signal to be input to the second detector.

24. The signal calibration method according to claim 17, further comprising:

adjusting the one of the reference clock signal, the first clock signal and the second clock signal according to a temperature value.

\* \* \* \* \*